(12) United States Patent
Tohta

(10) Patent No.: US 11,840,973 B2
(45) Date of Patent: Dec. 12, 2023

(54) VEHICLE CONTROL METHOD AND VEHICLE CONTROL APPARATUS

(71) Applicant: Nissan Motor Co., Ltd., Yokohama (JP)

(72) Inventor: Yuzuru Tohta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 44 days.

(21) Appl. No.: 16/472,260

(22) PCT Filed: Jan. 24, 2017

(86) PCT No.: PCT/JP2017/002276
§ 371 (c)(1),
(2) Date: Jun. 21, 2019

(87) PCT Pub. No.: WO2018/138762
PCT Pub. Date: Aug. 2, 2018

(65) Prior Publication Data
US 2019/0323444 A1 Oct. 24, 2019

(51) Int. Cl.
*F02D 41/16* (2006.01)
*B60W 30/20* (2006.01)
(Continued)

(52) U.S. Cl.
CPC .............. *F02D 41/16* (2013.01); *B60W 30/20* (2013.01); *F02D 29/00* (2013.01); *F02P 5/15* (2013.01);
(Continued)

(58) Field of Classification Search
CPC ...... F02D 41/16; F02D 31/003; B60W 30/20; F16H 59/40; F16H 2061/145; F16H 2059/405; F16H 2061/0488
(Continued)

(56) References Cited

U.S. PATENT DOCUMENTS 3,707,892 A * 1/1973 Kuroda ................... F02D 29/00
477/111
4,694,709 A * 9/1987 Kikuchi ................... F16H 61/20
701/54
(Continued)

FOREIGN PATENT DOCUMENTS

CN 102313004 A 1/2012
CN 103381822 A 11/2013
(Continued)

*Primary Examiner* — Logan M Kraft
*Assistant Examiner* — Joshua Campbell
(74) *Attorney, Agent, or Firm* — Global IP Counsels, LLP

(57) ABSTRACT

A vehicle control method is provided for controlling a vehicle in which a clutch provided on a power transmission path between an engine and a drive wheel is disconnected when a shift range is a non-driving range and the clutch is connected when the shift range is a driving range. The vehicle control method controls the engine to a prescribed idling speed, controls engine torque to a negative torque by delaying an ignition timing of the engine; and causes the prescribed idling speed to drop within a prescribed amount of time needed for the clutch to switch from being disconnected to being connected when the shift range is switched from the non-driving range to the driving range.

6 Claims, 3 Drawing Sheets

(51) Int. Cl.
  *F02D 29/00* (2006.01)
  *F02P 5/15* (2006.01)
  *F16H 59/40* (2006.01)
  *F16H 61/14* (2006.01)

(52) U.S. Cl.
  CPC ....... *F16H 59/40* (2013.01); *B60W 2710/027* (2013.01); *B60W 2720/10* (2013.01); *F16H 2059/405* (2013.01); *F16H 2061/145* (2013.01)

(58) Field of Classification Search
  USPC ........................................................ 701/110
  See application file for complete search history.

(56) References Cited

U.S. PATENT DOCUMENTS

| | | | | |
|---|---|---|---|---|
| 5,199,326 A | * | 4/1993 | Iwatsuki | F16H 61/0021 60/329 |
| 6,371,879 B1 | * | 4/2002 | Takahagi | F16H 61/061 475/116 |
| 6,942,530 B1 | * | 9/2005 | Hall | F02D 31/002 477/101 |
| 2004/0206332 A1 | * | 10/2004 | Mathews | F02D 41/083 123/339.11 |
| 2005/0188953 A1 | * | 9/2005 | Ishikawa | F02D 31/003 123/339.11 |
| 2012/0059567 A1 | * | 3/2012 | Seel | F02D 11/105 701/102 |

FOREIGN PATENT DOCUMENTS

| | | | | |
|---|---|---|---|---|
| EP | 962651 A1 | * | 12/1999 | ........... F02D 41/062 |
| EP | 1 350 950 A1 | | 10/2003 | |
| EP | 1 571 314 A1 | | 9/2005 | |
| EP | 1 574 707 A1 | | 9/2005 | |
| JP | 02091444 A | * | 3/1990 | |
| JP | 04058022 A | * | 2/1992 | |
| JP | 5-209545 A | | 8/1993 | |
| JP | 06317207 A | * | 11/1994 | |
| JP | 2005-248716 A | | 9/2005 | |
| JP | 2005248716 A | * | 9/2005 | ........... F02D 31/003 |
| JP | 2006-90218 A | | 4/2006 | |
| JP | 2006220042 A | * | 8/2006 | |
| JP | 2008255916 A | * | 10/2008 | |
| JP | 2010-159722 A | | 7/2010 | |
| JP | 2013024211 A | * | 2/2013 | |
| JP | 2014101766 A | * | 6/2014 | |

* cited by examiner

VEHICLE CONTROL METHOD AND VEHICLE CONTROL APPARATUS

CROSS-REFERENCE TO RELATED APPLICATIONS

This application is a U.S. national stage application of International Application No. PCT/JP2017/002276, filed on Jan. 24, 2017.

BACKGROUND

Technical Field

The present invention relates to a vehicle control method and a vehicle control apparatus whereby shock accompanying clutch engagement when switching from a non-driving range to a driving range as a result of the operation of a selection lever while the vehicle is stopped (referred to below as selection shock) is suppressed.

Background Information

Japanese Laid-Open Patent Application No. 2006-90218 (Patent Document 1) discloses technology that changes a target speed for an engine between a non-driving range and a driving range, and that changes a feedback gain when controlling for a target speed using feedback.

SUMMARY

However, with the technology of Patent Document 1, because feedback gain is held for a prescribed amount of time even if switching from a non-driving range to a driving range, it is difficult to suppress selection shock.

An objective of the present invention is to provide a vehicle control method able to mitigate selection shock.

In order to achieve the above objective, in a vehicle control method of the present invention, an idling speed of an engine is caused to drop within a prescribed amount of time needed for a clutch to switch from being disconnected to being connected when a shift range is switched from a non-driving range to a driving range.

Accordingly, it is possible to suppress inertial torque from an input-side rotating element of the clutch, and selection shock can be suppressed.

DETAILED DESCRIPTION OF THE EMBODIMENTS

Figure 1:
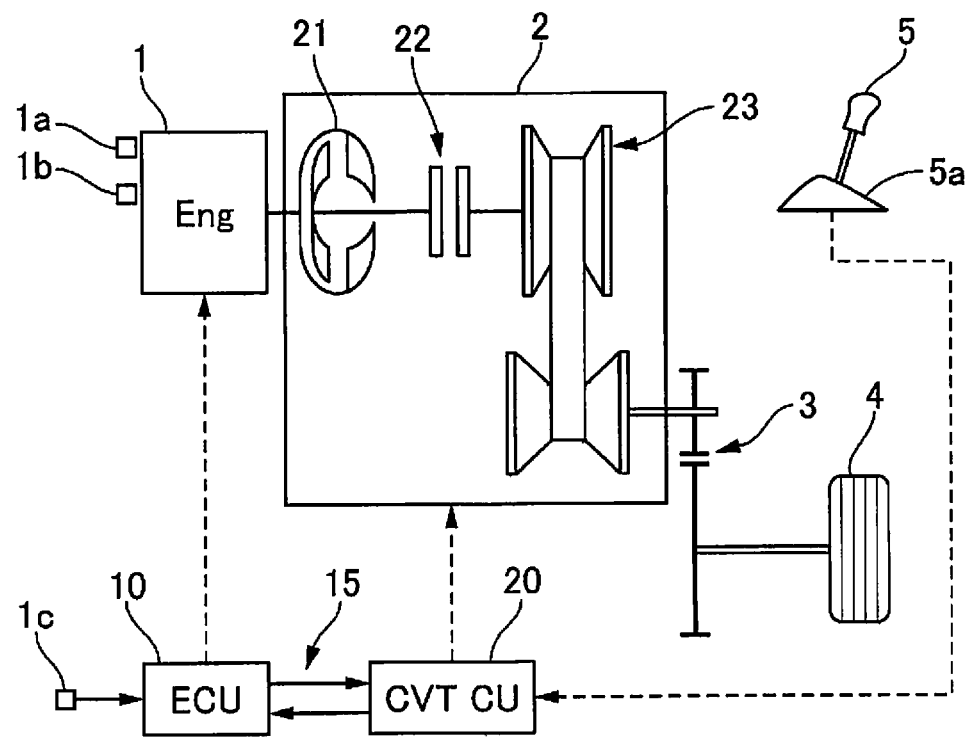
FIG. 1 is a system diagram for a vehicle to which selection control has been applied in accordance with a first embodiment.

FIG. 1 is a system diagram for a vehicle to which selection control of a first embodiment has been applied. Rotation outputted from an engine 1, which is an internal combustion engine, is inputted to an automatic transmission 2. Rotation inputted to the automatic transmission 2 is inputted to a belt-type continuously variable transmission mechanism 23 via a torque converter 21 and a clutch 22. The clutch 22 is a wet multi-plate clutch in which a plurality of clutch plates are stacked in an alternating manner. The clutch 22 controls a transmitted torque capacity on the basis of a controlling hydraulic pressure supplied from a control valve (not shown). Note that in the case of the first embodiment, although an engagement element that achieves forward movement and an engagement element that achieves reverse movement in a forward/reverse switching mechanism (not shown) respectively correspond to the clutch 22, a one-way clutch can be provided in addition to the forward/reverse switching mechanism, and there is no particular limitation thereto. Rotation, the speed of which has been changed by the belt-type continuously variable transmission mechanism 23, is transmitted to a drive wheel 4 via a final gear 3. The engine 1 has a throttle valve 1a that adjusts an intake air volume and an ignition device 1b that is able to control ignition timing.

A shift lever 5 that is operated by a driver switches a range position of a shift range 5a as a result of being operated. The shift range 5a has a parking range (referred to below as a P range), a reverse range for reverse movement (referred to below as an R range), a neutral range (referred to below as an N range), and a drive range for forward movement (referred to below as a D range). The shift range 5a outputs a range position signal that corresponds to the operative position of the shift lever 5. The clutch 22 is disconnected when the P range or the N range (also referred to below as non-driving ranges) is selected, and the clutch 22 is connected when the R range or the D range (also referred to below as driving ranges) is selected.

An engine control unit 10 (referred to below as an ECU) outputs a control signal to the throttle valve 1a and the ignition device 1b of the engine 1 and controls running conditions (engine speed Ne and engine torque Te) of the engine 1. An engine speed sensor 1c detects an engine speed Ne and outputs the engine speed Ne to the ECU. A transmission control unit 20 (referred to below as a CVTCU) receives the range position signal transmitted from the shift range 5a and controls the connection/disconnection of the clutch 22 and a gear ratio of the belt-type continuously variable transmission mechanism 23. The ECU and the CVTCU are connected by a CAN communication line 15 over which the mutual exchange of information is possible.

Selection control will now be described. When a non-driving range is selected, because the clutch 22 is disconnected, the engine 1 is set to a prescribed idling speed. If ancillary devices driven by the engine 1 are not being run when the engine 1 has finished warming up, the idling speed is set to N1, which is a low speed at which self-sustaining rotation is possible. From this state, if the shift lever 5 is operated and the shift range 5a selects a driving range, a controlling hydraulic pressure is supplied to the clutch 22, and torque is transmitted to the drive wheel 4 via the final gear 3 upon the transmitted torque capacity being ensured. While a braking torque greater than a creep torque is being produced, which is a state in which the driver has depressed a brake pedal, the vehicle remains stopped.

At such time, torsion occurs in a power transmission path between the engine 1 and the drive wheel 4 and the vehicle body sinks due to the action of a suspension between the drive wheel 4 and the vehicle body, or a counterforce acts on a mount between the power transmission path and the vehicle body and the vehicle body moves forward/backward and longitudinal acceleration G arises in the vehicle. When the engine speed Ne is set low, to N1, not much longitudinal acceleration G arises. However, while the engine is warming up or when an increase in idling speed is requested due to the running of ancillary devices, the engine speed Ne is set to N2, which is a high idling speed. In this case, because the clutch 22 is disconnected, while a non-driving range is selected a turbine runner of the torque converter 21 and a rotating element on the engine-side of the clutch 22 (referred to below as an input-side rotating element) are turned together at a speed approaching N2 as the idling speed rises. From this state, if the shift range 5a selects a driving range, at the point in time that the transmitted torque capacity is ensured by the clutch 22, the speed of the input-side rotating element immediately drops from N2. This leads to an issue where inertial torque from the input-side rotating element is outputted, and the change in torque at the time of selection is increased and the selection shock that accompanies a change in longitudinal acceleration (referred to below as longitudinal G) is liable to increase.

Accordingly, in the first embodiment, in a state in which the idling speed is set to N2, which is a high speed, when the shift lever 5 is moved from a non-driving range and a driving range is selected, the engine speed Ne is caused to drop as much as possible prior to the transmitted torque capacity being ensured by the clutch 22, and the clutch 22 is engaged in a state subject to less inertial torque from the input-side rotating element, thereby suppressing selection shock.

Figure 2:
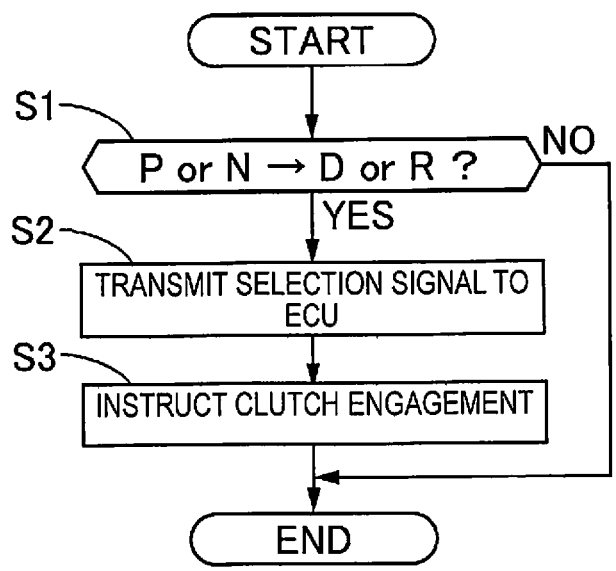
FIG. 2 is a control flow diagram performed within a CVTCU in the selection control of the first embodiment.
Figure 3:
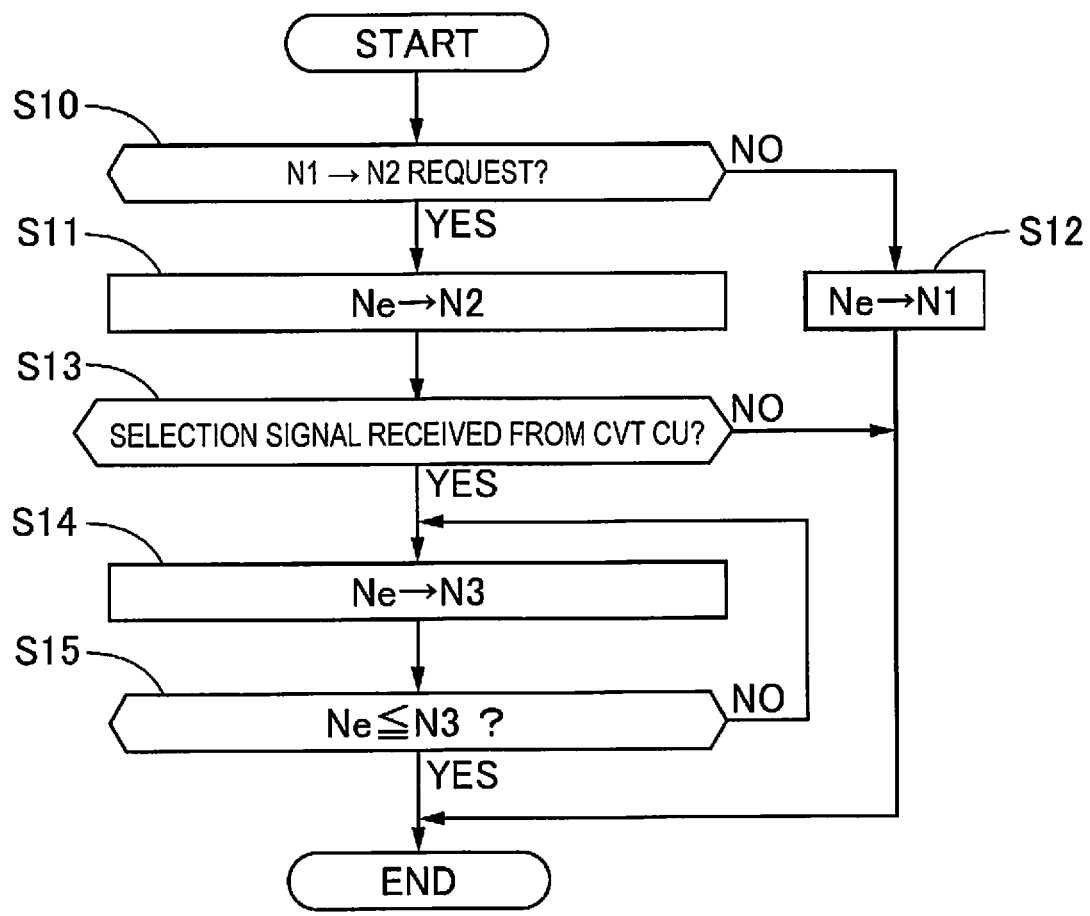
FIG. 3 is a control flow performed within an ECU in the selection control of the first embodiment.

FIG. 2 is a control flow performed within the CVTCU in the selection control of the first embodiment, and FIG. 3 is a control flow performed within the ECU in the selection control of the first embodiment. These flows are executed when the P range or the N range is selected and the engine 1 is running while the vehicle is stopped.

In step S1, a determination is made as to whether or not the range position signal has moved from the P range or the N range, which are non-driving ranges, and selected the D range or the R range, which are driving ranges. If it is determined that such a selection has been made, the control flow proceeds to step S2; otherwise the control flow ends.

In step S2, a selection signal is transmitted to the ECU.

In step S3, an engagement instruction is outputted to the clutch 22. Note that when the engagement instruction is outputted to the clutch 22, a precharge pressure instruction that eliminates play of the clutch plates is outputted for a prescribed amount of time, and the transmitted torque capacity is produced after play is eliminated.

In step S10, a determination is made as to whether or not there is a request to increase the idling speed from the idling speed N1, which is the normal idling speed. Such requests accompany the running of air conditioning, drops in engine coolant temperature, and increased load from ancillary engine devices such as an alternator. If there is determined to be a request to increase the idling speed, the control flow proceeds to step S11. Otherwise the control flow proceeds to step S12, where the idling speed is set to the normal idling speed N1, and then the control flow ends.

In step S11, a target speed for the engine speed Ne is set from N1 to N2 (>N1). Here, when a target speed is set, the engine speed Ne is controlled using the throttle angle and ignition timing in a feedback loop. Specifically, when the target speed is changed from N1 to N2, the throttle angle is increased, making the engine speed Ne rise.

In step S13, a determination is made as to whether or not a selection signal has been received from the CVTCU. When a selection signal has been received, the control flow proceeds to step S14; otherwise the control flow ends with the idling speed set to N2.

In step S14, the target speed for the engine speed Ne is set to N3, which is lower than N2. Here, when the target speed is changed from N2 to N3, the throttle angle is reduced, whereby the intake air volume of the engine 1 is decreased, and retard control that causes ignition timing to be delayed is executed, causing the engine speed Ne to drop. N3 can be the same speed as N1, and can be a speed higher than N1 so long as inertial torque from the input-side rotating element is of a value that can be decreased. For the purpose of temporarily reducing speed, N3 can also be set to a speed lower than N1. Moreover, because retard control is more responsive than throttle-angle-based engine torque control, the engine speed Ne is able to be decreased effectively. However, with retard control, when gas resulting from incomplete combustion is supplied to a catalyzer, heating of the catalyzer is concern. For this reason, in the first embodiment, selection control is avoided when the normal idling speed N1, at which not much selection shock occurs, has been set.

In step S15, a determination is made as to whether or not the engine speed Ne is less than or equal to N3. When Ne is higher than N3, the control flow returns to step S14 and steps S14 and S15 are repeated, and when Ne reaches a value less than or equal to N3, the control flow ends.

Figure 4:
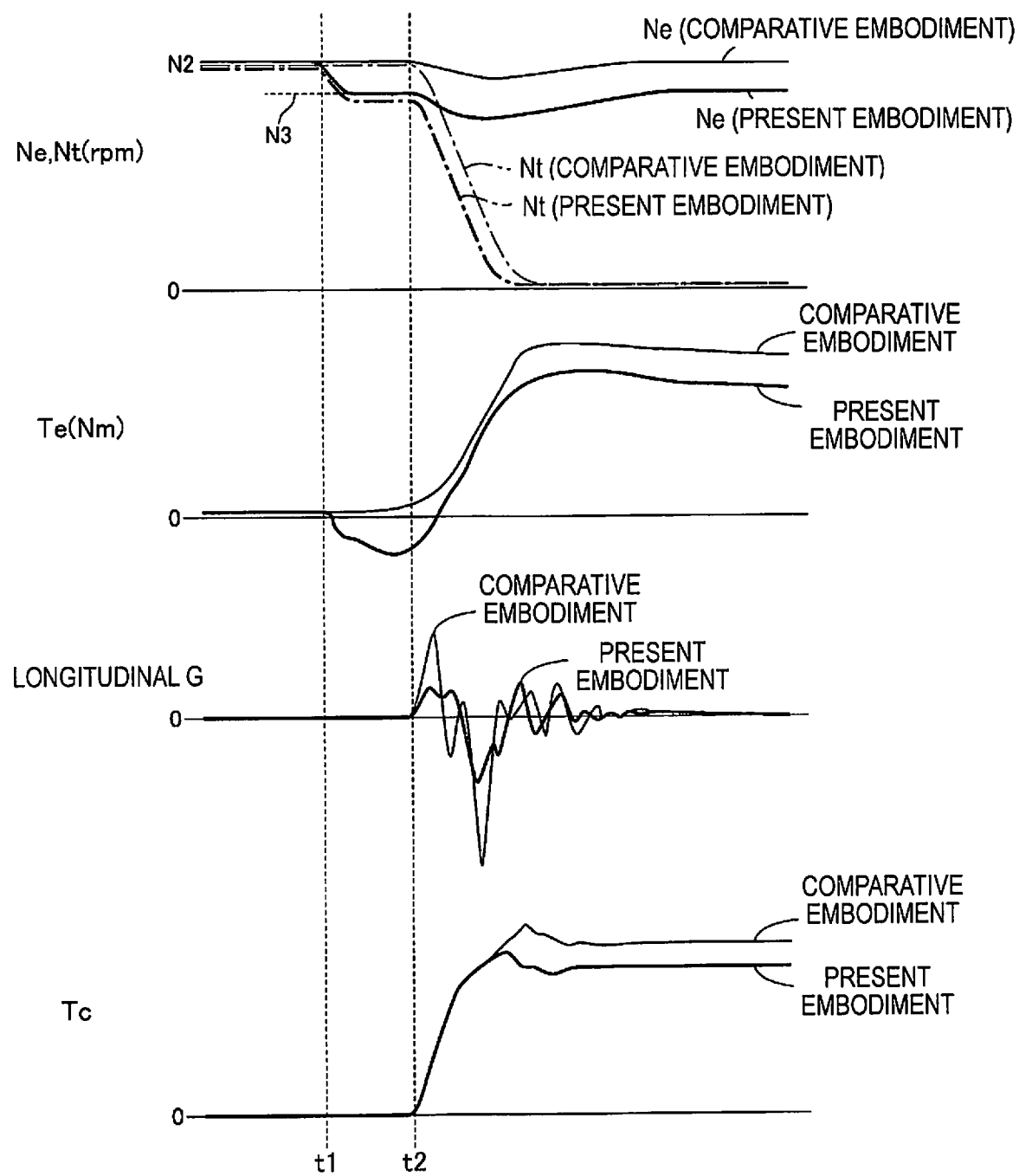
FIG. 4 is a timing chart illustrating a selection control process in the first embodiment.

FIG. 4 is a timing chart illustrating the selection control process of the first embodiment. A state at an initial point in time is such that the P range is selected and the idling speed is set to N2. In this chart, thin solid lines and thin chain lines represent a comparative example in which the engine speed Ne is not changed from N2 and in which the clutch 22 has been engaged. Thick solid lines and thick chain lines represent the first embodiment when selection control is performed. Note that in the uppermost timing chart in FIG. 4, the chain lines represent a turbine speed Nt, which is the speed of the input-side rotating element, and the solid lines represent the engine speed Ne. Further, Te represents engine torque, and Tc represents the transmitted torque capacity of the clutch 22.

In the comparative example, the driver operates the shift lever 5 at time t1, and approximately 0.3 seconds later, at time t2, when the clutch 22 starts to have a transmitted torque capacity Tc, the turbine speed Nt immediately starts to drop. Accordingly, because load on the torque converter 21 is increased, the engine torque Te also starts to rise. Consequently, longitudinal G arises in an oscillatory manner, and the peak thereof is also comparatively high.

In contrast, in the first embodiment, when the driver operates the shift lever 5 and the shift range position is switched from the P range to the D range at time t1, the target speed for the engine speed Ne is very quickly set from N2 to N3. The engine torque Te thus becomes a negative torque, due to retard control, and the engine speed Ne is caused to drop immediately to N3. When this occurs, the engine speed Ne is caused to drop to N3 prior to time t2, at which the transmitted torque capacity of the clutch 22 starts being produced. Accordingly, at time t2, the clutch 22 starts to have a transmitted torque capacity Tc, and inertial torque when the turbine speed Nt starts to drop can be suppressed. Because the peak of oscillations of longitudinal G can be suppressed, selection shock can be suppressed.

The following effects are achieved with the first embodiment, as described above.

(1) In a method for controlling a vehicle in which a clutch 22 provided on a power transmission path between an engine 1 and a drive wheel 5 is disconnected when a shift range 5a is a non-driving range and the clutch is connected when the shift range 5a is a driving range, the engine 1 is controlled to N2 (a prescribed idling speed), and an engine speed Ne is caused to drop from N2 within a prescribed amount of time needed for the clutch 22 to switch from being disconnected to being connected when the shift range 5a is switched from the non-driving range to the driving range. Accordingly, it is possible to suppress inertial torque from an input-side rotating element, and selection shock can be suppressed.

(2) An determination is made as to the presence of an increase idling speed request to set the prescribed idling speed to N2 (a second speed), which is higher than N1 (a first idling speed), and setting the prescribed idling speed to N2 upon determining the increase idling speed request is present, and setting the prescribed idling speed to N1 and maintaining N1 regardless of operation of the shift range 5a upon determining the increase idling speed request is not present. Accordingly, in cases where there is no request to increase idling speed, retard control is avoided, whereby heating of the catalyzer, etc., due to gas resulting from incomplete combustion can be suppressed.

(3) When the prescribed idling speed is caused to drop, the drop is caused by retard control (delaying an ignition timing of the engine). Accordingly, the engine speed Ne can be reduced in a highly responsive and efficient manner.

(4) When the prescribed idling speed is caused to drop, the drop is caused by decreasing an intake air volume of the engine. Specifically, a throttle angle is suppressed, whereby the engine speed Ne is caused to drop. Accordingly, the engine speed Ne can be reduced in an efficient manner. Because gas resulting from incomplete combustion is not produced as with retard control, the life of the catalyzer can be improved.

(5) When the prescribed idling speed is caused to drop, a torque of the engine 1 is controlled to a negative torque. Accordingly, the engine speed Ne can be caused to drop rapidly prior to when the clutch 22 starts to have a transmitted torque capacity.

(6) In an apparatus for controlling a vehicle provided with a clutch 22 that connects and disconnects a power transmission path between an engine 1 and a drive wheel 4, and with a shift range 5a that is switchable between a driving range and a non-driving range, a CVTCU (clutch control unit) that disconnects the clutch 22 when the shift range 5a is in the non-driving range and that connects the clutch 22 when the shift range 5a is in the driving range, and an ECU (engine control unit) that controls the engine 1 to a prescribed idling speed. The ECU causes the engine 1 to drop to a speed lower than N2 before the CVTCU finishes switching the clutch 22 from being disconnected to being connected when the shift range 5a is switched from the non-driving range to the driving range. Accordingly, it is possible to suppress inertial torque from an input-side rotating element, and selection shock can be suppressed.

Other Embodiments

Although a description of the present invention has been given on the basis of one embodiment, other configurations may be adopted for the specific configuration involved. In the first embodiment, although an example was given in which the belt-type continuously variable transmission mechanism 23 was employed for the transmission, another form of transmission can be adopted. Further, the clutch 22 in the first embodiment can be a starter clutch that is inside the transmission. Further, in the first embodiment, although after the idling speed is caused to drop from N2 to N3 the idling speed was continuously maintained at N3 without being restored to N2, a configuration can be adopted in which the completion of engagement of the clutch 22 is detected, and the idling speed is restored to N2 from N3 when engagement of the clutch 22 is complete. Requests to increase the idling speed can thereby be satisfied. The completion of engagement of the clutch 22 can be detected with a timer, or the completion of engagement can be detected as a point when a relative difference in speed between the turbine speed Nt and a speed of an output shaft of the transmission is less than or equal to a prescribed value. Further, in the first embodiment, although the engine speed Ne was caused to drop prior to when the clutch 22 starts to have transmitted torque capacity, the clutch side can be controlled such that the clutch 22 is given transmitted torque capacity after the engine speed Ne drops to N3.

The invention claimed is:

1. A vehicle control method for controlling a vehicle in which a clutch provided on a power transmission path between an engine and a drive wheel is disconnected when a shift range of an automatic transmission of the vehicle is a non-driving range and the clutch is connected when the shift range is a driving range, the vehicle control method comprising:

controlling the engine to a target idling speed;

determining whether an increase idling speed request is present to set the target idling speed to a second idling speed higher than a first idling speed, the first idling speed being a normal idling speed;

upon determining that the increase idling speed request is present, setting the target idling speed to the second idling speed and determining whether the shift range is switched from the non-driving range to the driving range;

upon determining the increase idling speed request is not present, setting the target idling speed to the first idling speed and maintaining the first idling speed without determining whether the shift range is switched from the non-driving range to the driving range;

when it is determined that the shift range is switched from the non-driving range to the driving range while the increase idling speed request is present, causing the target idling speed to drop to a third idling speed lower than the second idling speed before the clutch switches from a disconnected state to a connected state by delaying an ignition timing of the engine and decreasing an intake air volume of the engine, the connected state being a state in which the clutch has a transmitted torque capacity larger than zero, and the target idling speed being maintained at the third idling speed at least until completion of engagement of the clutch is detected, upon detecting that the completion of engagement of the clutch has occurred, increasing the target idling speed back to the second idling speed from the third idling speed, and the setting the target idling speed to the first idling speed and maintaining the first idling speed including maintaining the target idling speed at the first idling speed even after the shift range is switched from the non-driving range to the driving range and the completion of engagement of the clutch has occurred.

2. The vehicle control method according to claim 1, wherein the detecting whether the completion of engagement of the clutch has occurred is accomplished using a timer.

3. The vehicle control method according to claim 1, wherein the detecting whether the completion of engagement of the clutch has occurred is accomplished by detecting when a relative difference in speed between a turbine speed and a speed of an output shaft of the automatic transmission is less than or equal to a prescribed value.

4. A vehicle control apparatus for controlling a vehicle provided with a clutch that connects and disconnects a power transmission path between an engine and a drive wheel, and with an automatic transmission having a shift range that is switchable between a driving range and a non-driving range, the vehicle control apparatus comprising:

a clutch control unit that disconnects the clutch when the shift range is in the non-driving range and that connects the clutch when the shift range is in the driving range; and an engine control unit that controls the engine to a target idling speed, the engine control unit being configured to determine whether an increase idling speed request is present to set the target idling speed to a second speed higher than a first idling speed, the first idling speed being a normal idling speed, upon determining the increase idling speed request is present, set the target idling speed to the second speed and determine whether the shift range is switched from the non-driving range to the driving range, and upon determining the increase idling speed request is not present, set the target idling speed to the first idling speed and maintain the first idling speed without determining whether the shift range is switched from the non-driving range to the driving range, when it is determined that the shift range is switched from the non-driving range to the driving range while the increase idling speed request is present, the engine control unit causing the target idling speed to drop to a third idling speed lower than the second idling speed before the clutch switches from a disconnected state to a connected state by delaying an ignition timing of the engine and decreasing an intake air volume of the engine, the connected state being a state in which the clutch has a transmitted torque capacity larger than zero due to a control executed by the clutch control unit, and the engine control unit maintaining the target idling speed at the third idling speed at least until completion of engagement of the clutch is detected, the engine control unit being further configured to detect whether the completion of engagement of the clutch has occurred and increase the target idling speed back to the second idling speed from the third idling speed upon detecting that completion of the engagement of the clutch has occurred in a case where the shift range is switched from the non-driving range to the driving range while the increase idling speed request is present, and the engine control unit being further configured to maintain the target idling speed at the first idling speed even after the shift range is switched from the non-driving range to the driving range and the completion of engagement of the clutch has occurred in a case where the shift range is switched from the non-driving range to the driving range while the increase idling speed request is not present.

5. The vehicle control apparatus according to claim 4, wherein the engine control unit is configured to use a timer to detect whether the completion of engagement of the clutch has occurred.

6. The vehicle control apparatus according to claim 4, wherein the engine control unit is configured to detect that the completion of engagement of the clutch has occurred when a relative difference in speed between a turbine speed and a speed of an output shaft of the automatic transmission is less than or equal to a prescribed value.

* * * * *